United States Patent
Nishida et al.

(10) Patent No.: US 6,757,102 B2
(45) Date of Patent: Jun. 29, 2004

(54) POLARIZER, POLARIZING PLATE, AND VISUAL DISPLAY

(75) Inventors: Akihiro Nishida, Ibaraki (JP); Kazuki Tsuchimoto, Ibaraki (JP); Seiji Kondo, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/355,185

(22) Filed: Jan. 31, 2003

(65) Prior Publication Data

US 2003/0151813 A1 Aug. 14, 2003

(30) Foreign Application Priority Data

Feb. 5, 2002 (JP) ........................................ 2002-027632

(51) Int. Cl.$^7$ ................................................. G02B 5/30
(52) U.S. Cl. ...................... 359/491; 359/490; 264/1.34; 264/1.35; 252/585
(58) Field of Search ................................. 359/483, 485, 359/490, 491; 252/585; 264/1.34, 1.35

(56) References Cited

U.S. PATENT DOCUMENTS

| | | | | |
|---|---|---|---|---|
| 5,071,906 A | * | 12/1991 | Tanaka et al. | ............... 524/557 |
| 6,606,136 B2 | * | 8/2003 | Matsumoto et al. | .......... 349/96 |
| 2001/0024322 A1 | * | 9/2001 | Harita et al. | ................. 359/490 |
| 2002/0008840 A1 | * | 1/2002 | Sakamaki et al. | .......... 349/194 |

FOREIGN PATENT DOCUMENTS

| | | | |
|---|---|---|---|
| JP | 08-240715 A | * | 9/1996 |
| JP | 8-304624 | | 11/1996 |
| JP | 2001-290025 | | 10/2001 |
| JP | 2001-290027 A | * | 10/2001 |

* cited by examiner

Primary Examiner—John Juba, Jr.
(74) Attorney, Agent, or Firm—Westerman, Hattori, Daniels & Adrian, LLP

(57) ABSTRACT

A polarizer comprising a polyvinyl alcohol based film being dyed by iodine and treated with potassium iodide, wherein an element content ratio (K/I) of iodine (I) and potassium (K) is 0.05 through 0.24, show an effect controlling coloring and satisfying high durability under conditions of high temperature.

4 Claims, No Drawings

POLARIZER, POLARIZING PLATE, AND VISUAL DISPLAY

BACKGROUND OF THE INVENTION

1. Field of the Invention

The present invention relates to a process of producing a polarizer and a polarizer obtained by the process concerned. And the present invention relates to a polarizing plate using the polarizer concerned. Furthermore, a visual display, such as a liquid crystal display, an organic EL display, a PDP (plasma display panel), using the polarizing plate concerned.

2. Description of the Prior Art

As a polarizing plate conventionally used for image viewing displays, such as liquid crystal display, in general, an iodine treated polarizing film in which iodine is adsorbed in a polyvinyl alcohol based film and then the film is oriented, and a dyestuff treated polarizing film in which dichromatic dyes are adsorbed in the polyvinyl alcohol base film and then the film is oriented are known as a polarizer and they are commonly used. In these polarizing plates, since a polarizing plate using an iodine treated polarizing film as a polarizer gives contrast higher than a polarizing plate using dyestuff treated polarizing film as a polarizer, they are suitably used. Besides, a polarizer processed by potassium iodide gives a polarizer that has a little coloring, and demonstrates approximately constant absorbance over approximately all wavelength regions of visible light to demonstrate neutral gray. The polarizer concerned is usually used as a polarizing plate with which protective films, such as triacetyl cellulose film, are adhered on one side or both sides.

However, in recent years, in plenty of cases, image viewing displays, such as liquid crystal displays, are used under high temperature conditions etc. for a long period of time as applicable field becomes wider, and as a result, requirements for polarizing plates (polarizers) becomes severe, and image viewing displays having characteristics suitable for usages are now on demands. In connection with the circumstance, optical durability under heated conditions, especially characteristics of giving no hue change is also required for polarizing plates.

An object of the present invention is to provide a polarizer comprising a polyvinyl alcohol based film controlling coloring and satisfying high durability under conditions of high temperature.

And other object of the present invention is to provide a polarizing plate utilizing the polarizer and further a visual display utilizing the polarizing plate.

SUMMARY OF THE INVENTION

As a result of repeated examinations carried out wholeheartedly by the present inventors to solve the above-mentioned problems, a process of producing a polarizer shown below was found out and the present invention was completed.

The present invention relates to a polarizer comprising a polyvinyl alcohol based film being dyed by iodine and treated with potassium iodide, wherein an element content ratio (K/I) of iodine (I) and potassium (K) is 0.05 through 0.24.

In the above described present invention, in a polarizer comprising polyvinyl alcohol based film that is dyed by iodine, and is treated by potassium iodide etc., and whose coloring is suppressed, polarization function and hue of the polarizer are determined based on a state of a complex of iodine, but when iodine or potassium not participating in polarizing function and hue exists, it is assumed that adverse influence demonstrated under high temperature gives change of transmittance, polarizing degree, and hue, and thereby durability under high temperature is improved by controlling content of iodine and potassium in the above described polarizer to necessary minimum.

When an element content ratio (K/I) of iodine (I) and potassium (K) is controlled to 0.24 or less, a polarizer may be obtained in which coloring is suppressed, change of transmittance and polarizing degree, etc. at high temperature is small, superior in durability, and moreover polarizing degree is high. When the element content ratio (K/I) is more than 0.24, it is not preferable because optical characteristics when being heated at high temperature fall.

As for an element content ratio (K/I), it is preferable that an optimal element content ratio (K/I) may be selected according to usage. That is, in the case of semitransparent and reflective type liquid crystal modules, external light transmits a polarizing plate once, and a reflective plate then reflects it, and again it transmits into the polarizing plate, and thereby influence of hue of the polarizing plate is greatly demonstrated. Since a large element content ratio (K/I) enlarges a b value of a polarizing plate and the polarizing plate tends to look yellowish in response to influence of hue, the element content ratio (K/I), is preferably set to 0.05 through 0.18. In the case of liquid crystal modules for transmission type high definition displays, such as monitor of notebook type personal computer, and liquid crystal TV, since light from a backlight transmits a polarizing plate only once, an element content ratio (K/I) is preferably set to 0.10 through 0.24. Element percentage of iodine (I) and potassium (K) in a polarizer is determined from an element content analyzed by a fluorescent X-ray analysis etc.

And the present invention relates to a polarizing plate with which a transparent protective layer is prepared at least in one side of the above described polarizer.

In the above-mentioned polarizing plate, comprising at least one of a retardation plate, a viewing angle compensation film, a reflective plate, a transflective plate and a brightness enhancement film, is used.

Furthermore, the present invention relates to a visual display using the above-described polarizing plate.

DETAILD DESCRIPTION OF THE INVENTION

Polyvinyl alcohols or derivatives thereof are used for a material of a non-stretched film in a process of producing a polarizer of the present invention. As derivatives of polyvinyl alcohol, in addition to polyvinyl formals, polyvinyl acetals, etc. may be mentioned, and derivatives modified with olefins, such as ethylene and propylene; unsaturated carboxylic acids, such as acrylic acid, methacrylic acid, and crotonic acid; alkyl esters of the above described unsaturated carboxylic acids and acrylamide etc. may be mentioned. Generally, polyvinyl alcohol with approximately 1000 to 10000 of degree of polymerization and approximately 80 to 100 mol % of degree of saponification is used.

In addition, additives, such as plasticizers, may also be contained in the above described polyvinyl alcohol film. As plasticizers, polyols and condensates thereof, etc., for example, glycerin, diglycerin, triglycerin, ethylene glycol, propylene glycol, polyethylene glycols, etc. may be mentioned. Although an amount of the plasticizers used is not especially limited, it is preferable to be set no more than 20% by weight in the non-stretched film.

A uniaxial stretching processing and a dyeing processing by iodine are given to the above described polyvinyl alcohol based film (unstretched film), according to conventional methods, and further a processing by boric acid is conducted. Besides, a processing by potassium iodide is conducted to the polyvinyl alcohol based film (unstretched film). A processing by potassium iodide can be carried out by making potassium iodide included in a processing liquid concerned during a dyeing processing by iodine and a processing by boric acid, and in addition, it can be carried out, separately with the above described processing, by conducting an impregnation processing by a potassium iodide solution. The polyvinyl alcohol based film (stretched film) with the above described processing conducted thereto is dried by a conventional method, and a polarizer is obtained.

Besides, in preparation of a polarizer comprising a polyvinyl alcohol based film (stretched film), conditions, such as dipping temperature and dipping period in the above described each processing, and concentration of each processing liquid, are controlled so that an element content ratio (K/I) of iodine (I) and potassium (K) in the polarizer concerned may give a value in a range of 0.05 through 0.24.

In addition, content of iodine (I) in a polyvinyl alcohol based film (stretched film) is usually controlled to about 0.5 through 5% by weight so that a polarizer may show satisfactory durability and satisfactory degree of polarization, and preferably it is controlled to 1 through 4% by weight, and more preferably 1 through 3% by weight. Besides, content of potassium (K) is usually controlled to approximately 0.05 through 1.5% by weight in consideration of suppressing coloring of a polarizer, and preferably 0.1 through 1% by weight.

A stretching method in uniaxial stretching processing is not especially limited, but both a wet type stretching method and a dry type stretching method may be employable. As a stretching means in the dry type stretching method, for example, an inter-roll stretching method, a heated roll stretching method, and a compression stretching method, etc. may be mentioned. Stretching may also be carried out in multi-stage. In the above described stretching means, unstretched film is usually processed in a heated state. Usually, an unstretched film having a thickness of approximately 30 through 150 μm is used. A stretching ratio of a stretched film is suitably set in accordance with required characteristics, and it is desirable to be set to approximately 2 through 7 times, and preferably 3 through 6.5 times, and more preferably 3.5 through 6 times. It is suitable for a thickness of a stretched film to be approximately 5 through 40 μm.

Generally immersing a polyvinyl alcohol based film in an iodine solution carries out a dyeing processing by iodine. When an iodine aqueous solution is used as an iodine solution, an aqueous solution including iodine ion is generally used, using iodine and, for example, potassium iodide etc. as dissolving auxiliary agent. A concentration of iodine used is approximately 0.01 through 0.5% by weight, and preferably 0.02 through 0.4% by weight, and a concentration of potassium iodide used is approximately 0.01 through 10% by weight, and preferably 0.02 through 8% by weight.

In a dyeing processing by iodine, a temperature of an iodine solution is usually approximately 20 through 50° C., and preferably 25 through 40° C. Dipping period is usually in a range of approximately 10 through 300 seconds, and preferably of 20 through 240 seconds. In a dyeing processing by iodine, conditions, such as a concentration of iodine solution, and a dipping temperature and a dipping period to the iodine solution of a polyvinyl alcohol based film are adjusted, and thus iodine content and an element content ratio (K/I) in the polyvinyl alcohol based film may be set in the above described range. A dyeing processing by iodine may be carried out in any stage before uniaxial stretching processing, during uniaxial stretching processing, and after uniaxial stretching processing.

Dipping a polyvinyl alcohol based film into a boric acid aqueous solution carries out a processing by boric acid. Boric acid concentration in the boric acid aqueous solution is approximately 2 through 15% by weight, and preferably 3 through 10% by weight. In a boric acid aqueous solution, potassium iodide may be included.

A temperature of a boric acid aqueous solution is not especially limited in a processing by boric acid, but it is 30° C. or more, and is preferably in a range of 40 through 85° C., for example. A dipping period is usually for 10 through 1200 seconds, and preferably for 30 through 600 seconds. Stage of giving the processing by boric acid is after a dyeing processing by iodine. The processing by boric acid is carried out during or after a uniaxial stretching. Besides, a rinsing processing may be carried out after the processing by boric acid. It is preferable to carry out the rinsing processing in pure water. The rinsing processing is carried out, for example, at 5 through 50° C., and preferably at 5 through 40° C., and it is carried out for 1 second through 10 minutes, and preferably for 1 second through 5 minutes.

A potassium iodide aqueous solution is used, for example, in impregnation processing by potassium iodide. A potassium iodide concentration is preferably set to approximately 0.5 through 10% by weight, and more preferably 1 through 8% by weight. In the potassium iodide impregnation processing, a temperature of the aqueous solution is usually approximately 15 through 60° C., and preferably 25 through 40° C. A dipping period is usually in a range of approximately 1 through 120 seconds, and preferably 3 through 90 seconds.

Besides, a zinc impregnation processing by a zinc salt aqueous solution etc. may be suitably conducted to a polyvinyl alcohol based film (stretched film), and the zinc salt aqueous solution may include potassium iodide.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers;

polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

A hard coat layer may be prepared, or antireflection processing, processing aiming at sticking prevention, diffusion or anti glare may be performed onto the face on which the polarizing film of the above described transparent protective film has not been adhered (the face without the above described application layer thereon).

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 $\mu$m, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 $\mu$m.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The present invention will be specifically described by way of Examples and Comparative Examples. In these examples, the "%" represents "% by weight".

Example 1

Between 105° C. heating rolls and pinch rolls, a polyvinyl alcohol film (2400 of average degree of polymerization, 99.9% of degree of saponification) having a thickness of 80 μm was stretched 4 times, under tension. Subsequently, the stretched film was dipped in a dyeing bath with iodine and potassium iodide blended therein, at 30° C., for 60 seconds, and was dyed. Subsequently, it was stretched 1.4 times while being dipped for 120 seconds into 70° C. boric acid aqueous solution. Furthermore, a rinsing processing was given for 3 seconds in 25° C. pure water. Subsequently, it was dipped in an aqueous solution of 3% of potassium iodide concentration for 3 seconds at 30° C. Then, it was dried for 4 minutes at 50° C. to obtain a polarizer. A triacetyl cellulose film with a saponification processing given to a surface thereof and having a thickness of 80 μm was adhered on both sides of the polarizer with a polyvinyl alcohol based adhesive, and subsequently it was dried for 4 minutes at 50° C. to obtain a polarizing plate.

Example 2

A polyvinyl alcohol film (2400 of average degree of polymerization, 99.9% of degree of saponification) having a thickness of 80 μm was dipped in pure water at 30° C., and swelled. Subsequently, the stretched film was dyed while being dipped for 60 seconds at 30° C. in a dyeing bath with iodine and potassium iodide blended therein, and was simultaneously stretched 2.5 times. Subsequently, it was stretched 2.3 times while being dipped for 60 seconds into a 40° C. boric acid aqueous solution. Furthermore, it was dipped in an aqueous solution of 5% of potassium iodide concentration for 5 seconds at 30° C. Then, it was dried for 4 minutes at 50° C. to obtain a polarizer. A triacetyl cellulose film with a saponification processing given to a surface thereof and having a thickness of 80 μm was adhered on both sides of the polarizer with a polyvinyl alcohol based adhesive, and subsequently it was dried for 4 minutes at 50° C. to obtain a polarizing plate.

Comparative Example 1

A polyvinyl alcohol film (2400 of average degree of polymerization, 99.9% of degree of saponification) having a thickness of 80 μm was dipped in pure water at 30° C., and swelled. Subsequently, the stretched film was dyed while being dipped for 60 seconds at 30° C. in a dyeing bath with iodine and potassium iodide blended therein, and was simultaneously stretched 2.5 times. Subsequently, it was stretched 2.3 times while being dipped for 60 seconds into a 40° C. boric acid aqueous solution. Furthermore, it was dipped in an aqueous solution of 8% of potassium iodide concentration for 5 seconds at 30° C. Then, it was dried for 4 minutes at 50° C. to obtain a polarizer. A triacetyl cellulose film with a saponification processing given to a surface thereof and having a thickness of 80 μm was adhered on both sides of the polarizer with a polyvinyl alcohol based adhesive, and subsequently it was dried for 4 minutes at 50° C. to obtain a polarizing plate.

Following evaluation was carried out for the polarizers and the polarizing plates prepared in Examples and Comparative Examples.

(Measuring Method of Iodine Content and Potassium Content)

A fluorescent X-ray analysis was carried out and the polarizers were measured for iodine content (%) and a potassium content (%). Values of element content ratios (K/I) of iodine (I) and potassium (K) were determined from measurement results. Table 1 shows obtained results.

Measuring apparatus: Fluorescent X-ray analysis equipment ZSX100e, manufactured by Rigaku Corporation Source of X-rays: Rh Output: 40 kV, 90 mA Diameter of measurement: 10 mmφ

Atmosphere: under vacuum condition

Measuring method: Quantitative analysis was carried out with a thickness and B content of polarizers as a fixed value using a thin film standard sample.

TABLE 1

|  | Potassium (K) content (%) | Iodine (I) content (%) | Element content ratio (K/I) |
|---|---|---|---|
| Example 1 | 0.30 | 1.67 | 0.18 |
| Example 2 | 0.74 | 3.34 | 0.22 |
| Comparative Example 1 | 1.55 | 6.14 | 0.25 |

TABLE 2

|  | Orthogonal value (a) | | Orthogonal value (b) | | Orthogonal Δab | | Transmittance % | | Degree of polarization (%) | |
|---|---|---|---|---|---|---|---|---|---|---|
|  | At an initial stage | After 300 hours | At an initial stage | After 300 hours | At an initial stage | After 300 hours | At an initial stage | After 300 hours | At an initial stage | After 300 hours |
| Example 1 | 0.182 | 6.474 | −1.443 | 3.286 | 1.455 | 7.264 | 43.41 | 44.65 | 99.96 | 99.49 |
| Example 2 | 0.715 | 6.920 | −1.151 | 3.716 | 1.356 | 7.857 | 43.63 | 44.81 | 99.96 | 99.20 |
| Comparative Example 1 | 1.731 | 11.568 | 0.059 | 5.583 | 1.735 | 12.847 | 43.69 | 45.17 | 99.94 | 98.14 |

(Hue and Change Thereof)

An orthogonal chromaticity of a polarizing plate at an initial stage ($a_0$, $b_0$), and an orthogonal chromaticity ($a_{300}$, $b_{300}$) after being kept under condition of 90° C. for 300 hours were determined. A value (a) and a value (b) are "value (a)", and "value (b)" in Hunter color system. Change Δab of orthogonal hue was determined from them.

Initial stage: $\Delta ab = \sqrt{(a_0^2 + b_0^2)}$

After 300 hours: $\Delta ab = \sqrt{(a_{300}^2 + b_{300}^2)}$

Origin (0,0): Shown how the sample is separated from neutral color.

Table 2 shows results.

(Light Transmittance)

A spectrophotometer (CMS-500, made by Murakami Color Research Laboratory) was used to measure the transmittance of a polarizing plate. The transmittance of the polarizing plate is a Y value subjected to relative spectral responsively correction based on 2-degree visual field (C light source) described in JIS Z 8701.

(Polarization Degree)

The spectrophotometer was used to measure the transmittance ($H_0$) in the case in which two polarizing plates, which were the same, were overlapped with each other in such a manner that their polarizing axes would be in parallel and the transmittance ($H_{90}$) in the case in which the two polarizers were overlapped with each other in such a manner that their polarizing axes would be orthogonal. The polarization degree was calculated from the following equation:

Polarization degree (%) = $\sqrt{\{(H_0 - H_{90})/(H_0 + H_{90})\}} \times 100$

The parallel transmittance ($H_0$) and the orthogonal transmittance ($H_{90}$) were Y values subjected to relative spectral responsively correction based on 2-degree visual field (C light source).

Both of the absolute values for the orthogonal values a and b in Examples are controlled small and thus coloring is controlled, moreover hue changes are small even under a high temperature condition, and besides changes of transmittance and degree of polarization are suppressed well, which show satisfactory high durability. In Comparative Example 1, since an element content ratio (K/I) is large, a hue change is shown large, and moreover changes of transmittance and degree of polarization are shown large, which cannot satisfy high durability.

What is claimed is:

1. A polarizer comprising a polyvinyl alcohol based film dyed by iodine and treated with potassium iodide, the film having an element content ratio (K/I) of iodine (I) and potassium (K) in the range from 0.05 through 0.24.

2. A polarizing plate comprising a transparent protective layer provided on at least one side of the polarizer according to claim 1.

3. The polarizing plate according to claim 2, comprising at least one of a retardation plate, a viewing angle compensation film, a reflective plate, a transflective plate and a brightness enhancement film.

4. A visual display comprising at least one polarizing plate according to claim 2 or 3.

* * * * *